June 16, 1925. 1,542,621
A. J. LONGSTREET ET AL
CART
Filed Feb. 8, 1924
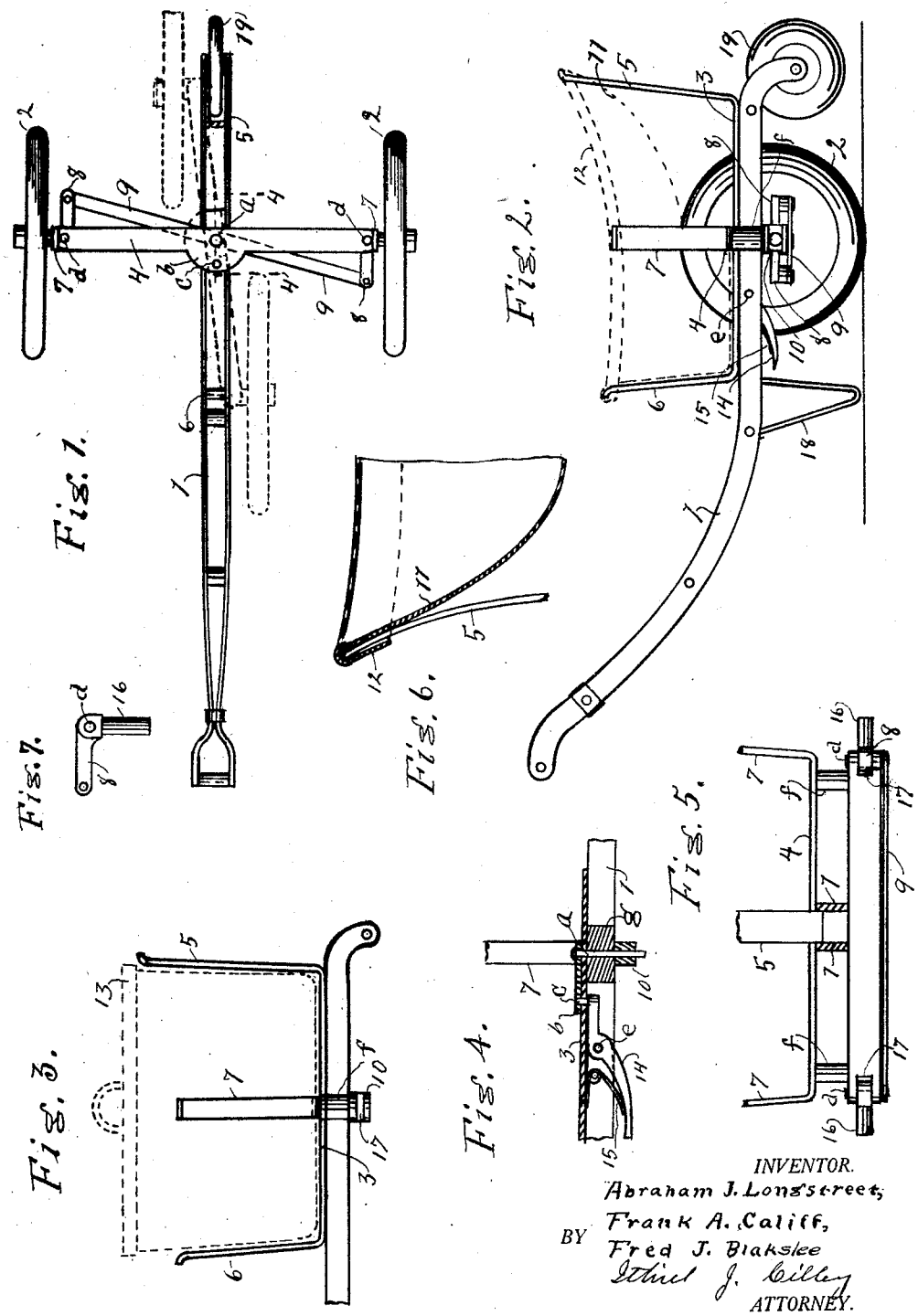
INVENTOR.
Abraham J. Longstreet,
Frank A. Califf,
BY Fred J. Blakslee
ATTORNEY.

Patented June 16, 1925.

1,542,621

UNITED STATES PATENT OFFICE.

ABRAHAM J. LONGSTREET, FRANK A. CALIFF, AND FRED J. BLAKSLEE, OF GRAND RAPIDS, MICHIGAN.

CART.

Application filed February 8, 1924. Serial No. 691,393.

*To all whom it may concern:*

Be it known that we, ABRAHAM J. LONGSTREET, FRANK A. CALIFF, and FRED J. BLAKSLEE, citizens of the United States, residing at Grand Rapids, in the county of Kent and State of Michigan, have invented certain new and useful Improvements in Carts, of which the following is a specification.

Our invention relates to improvements in small hand carts, and its objects are: First, to provide a cart that may be readily converted into a baby cab; second, to provide a cart that may be readily converted into a receptacle for storing and carrying a bushel basket; third, to provide a cart with which the wheels and axletree may be readily thrown around practically parallel with the handle and axletree supporting elements of the cart, and, fourth, to provide a means whereby the axletree and cross beam of the cart may be readily locked in place crosswise of the handle bar and supporting elements hereinbefore mentioned.

We attain these objects by the mechanism and construction of parts shown in the accompanying drawing, in which—

Fig. 1 is a plan of the cart in normal form, and with the axletree and wheels shown in outline as having been adjusted parallel with the handle bar elements. Fig. 2 is a side elevation of the cart with the near wheel removed, and with a baby cab seat and shields shown in outline. Fig. 3 is an elevation of the body part of the cart showing, in outline, the manner of adapting it to the storage and carriage of a bushel basket. Fig. 4 is a side elevation of the body of the cart shown partly in section on the line 4—4 of Fig. 1, and disclosing the manner of locking the axletree and cross bunk of the cart in normal position. Fig. 5 is a back elevation of the axletree and body of the cart showing the manner of connecting the cross bar or bunk of the cart with the axletree, Fig. 6 shows how a seat or container may be attached to the arms of the cart, and Fig. 7 is a plan of the wheel bearing detached from the axletree.

Similar letters and numerals of reference indicate similar parts throughout the several views.

In the drawing 1 represents the handle and supporting elements of the cart, which is made of two bars of plano-convex metal with the plain sides adjacent and the bars riveted in place, substantially as shown in Figs. 1 and 2. The plate 3 is secured to these bars, longitudinally thereof, and has arms 5 and 6 extending upwardly from each end thereof, the arm 5 being much longer than the arm 6, for the purpose of enabling us to form a suitable child's seat in the cart, to be hereinafter more fully explained. To complete the cart we place an axletree 10 below the body bars 1, and a cross plate 4 above these bars, the two being firmly secured together near the ends by means of the supporting posts *f*, and pivotally connected with the bars and plate 3, as indicated at *a* in Figs. 1 and 4, so it may be carried around into position practically parallel with the bars, as indicated in outline in Fig. 1. This cross plate has an offset *b* projecting from the relatively back edge thereof, which said offset is provided with a means whereby it may be utilized for locking the plate rigidly in place, as by the use of a pin *c*, applied as follows: The pin *c* is mounted upon one end of a lever 14, which lever is pivotally mounted between the side bars 1, as at *e*, and is held in normal position, with the pin *c* engaging the offset *b*, by means of any available form of spring, as indicated at 15 in Fig. 4, in such a manner that by pressing upon the long, or free end of said lever, the pin *c* will be withdrawn sufficiently to free the plate 4 and allow of its free pivotal movement as hereinbefore indicated. The plate 4 has an upwardly extending arm, 7, at each end, of a height equal to the height of the arm 6. The upper ends of all of these arms are curved outwardly for the purpose, first, of providing a means whereby a bushel basket may be entered between them without danger of catching thereon and hindering the free entering of the basket, and, second, to provide safe and easy supports for the upper edges of canvas that may be properly formed and adapted for the construction of a baby seat and guard in the cart. The arm 5 is made longer than the other arms for the purpose of providing a high back to the baby seat. If it is desired to carry a bushel basket in the cart, it is entered and supported substantially as indicated by the dotted outlines shown at 13 in Fig. 3.

In the construction of a baby cab seat and guard, the same is made of canvas, and is applied substantially as indicated by the dotted outlines 11 and 12 in Fig. 2. At 12 we have shown the outline of a downwardly folded border that is designed to pass over the ends of the arms 5, 6 and 7 and by means of which the seat and guard is mounted and supported in the cart, converting the same into an available baby cab.

For the purpose of rendering the wheel bearings so adjustable as to enable us to throw the wheels 2 around parallel with the body bars 1 of the cart, we provide separate wheel bearings 16 and pivotally connect them with the ends of the axletree, by any available means and construction, as indicated at 17 in Fig. 3, by means of properly applied pins $d$. These wheel bearings are provided with outwardly projecting arms 8, positioned at opposite sides of the axletree, and said arms are connected by a connecting bar 9 of a proper length so that, combined with the offsets formed by the projecting arms, it will cause the wheels to become adjusted parallel with the bars 1, as indicated in outline in Fig. 1.

18 represents a leg or standard for supporting the cart when not being propelled, 19 is an idle wheel for use when desiring to lift the cart upon a walk that is located considerably above the surface upon which the cart is being used, especially if the edge of the walk forms a square upright barrier in the path of the cart, and $g$ is a supporting block between the axletree 10 and the plate 3 through which the pivot pin $a$ is passed.

With this construction we have been able to produce a cart that is not only capable of transformation from a plain hand cart into a basket carrying cart, or into an available baby cab, but one that may be readily adjusted into small space for storing, shipping, carrying about from place to place, etc.

Having thus fully described our invention, what we claim as new in the art, is:

1. In combination with the wheels, the axletree and the supporting beam of a cart, a plate secured to the supporting beam of the cart longitudinally thereof and having upwardly extending arms integral therewith, said supporting beam and plate supported upon the axletree, a cross plate immediately above the longitudinal plate and having its ends securely attached to the ends of the axletree, and integral arms extending upwardly from the plate at the ends of the axletree, the axletree and the cross plate pivotally connected with the supporting beam, a wheel bearing pivotally connected with each end of the axletree, and a rod so connected with said pivotal end bearings that when the axletree and the plate are carried around parallel with the supporting beam the wheels will be, also, carried into a position parallel with the supporting beam.

2. In combination with the elements covered in claim 1, a latch pivotally connected with the supporting beam and having a pin connected therewith in position to engage the cross plate and lock said plate and the axletree in fixed position at right angles with the supporting beam, and to be made to readily release said plate and axletree for pivotal adjustment upon the supporting beam.

3. In combination with the elements covered in claim 1, a canvas supported upon the upwardly extending arms in position to form a carrying receptacle in the cart.

Signed at Grand Rapids, Michigan, February 6, 1924.

ABRAHAM J. LONGSTREET.
FRANK A. CALIFF.
FRED J. BLAKSLEE.